H. C. HAYES 2,000,948
APPARATUS FOR DETERMINING THE FORCE OF GRAVITY
Filed Aug. 16, 1927
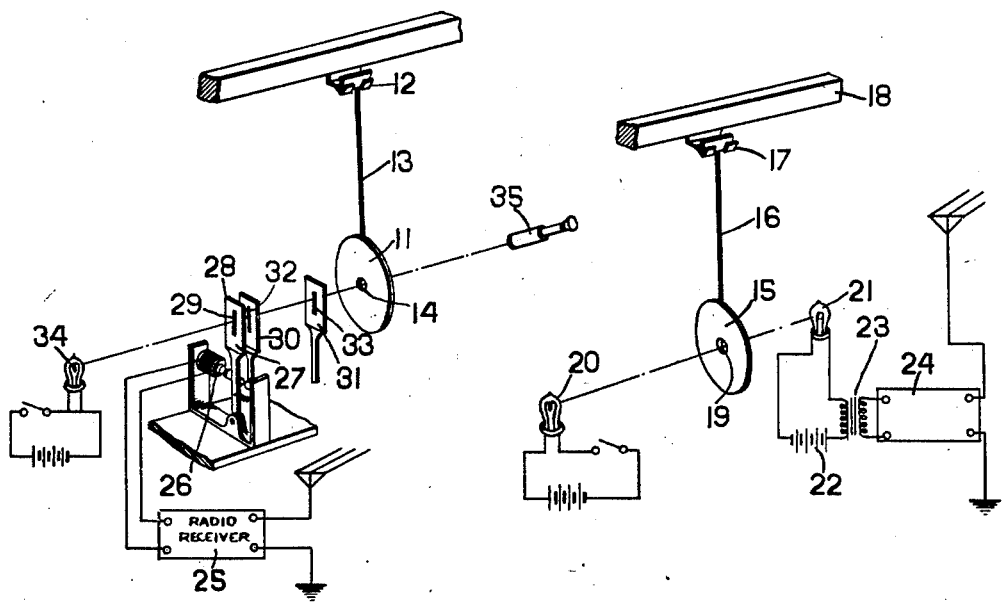
Inventor
HARVEY C. HAYES
By HIS Attorney
Harold Dodd.

UNITED STATES PATENT OFFICE 2,000,948

APPARATUS FOR DETERMINING THE FORCE OF GRAVITY

Harvey C. Hayes, Washington, D. C.

Application August 16, 1927, Serial No. 213,427

1 Claim. (Cl. 265—1)

(Granted under the act of March 3, 1883, as amended April 30, 1928; 370 O. G. 757)

The invention herein described may be manufactured and used by or for the Government of the United States for governmental purposes without the payment to me of any royalty thereon or therefor.

The primary object of the present invention is to effect the simplification and improvement of the apparatus now commonly employed in the determination of what is generally known as the "gravitational constant" at desired points on the surface of the earth.

Among the improved features of the invention may be mentioned the development of apparatus for accomplishing the purpose specified whereby the employment of accurate chronometers is dispensed with and the resultant errors attendant upon the use of inaccurate instruments of this kind are to a large extent eliminated. Another feature of the invention is the provision of apparatus to be used in the direct comparison of the values of the gravitational constant at a variety of points within a wide area without the necessity of apparatus for determining the exact value of the constant at any of these points. This feature of the invention becomes important due to the fact that the determinations are materially expedited and rendered more accurate, and it is the relative value of the constant rather than its actual value that is the important thing from the standpoint contemplated by the present invention.

It is a well known fact that the earth-pull on a unit of mass or the force of gravity which is herein called the "gravitational constant" and is commonly designated by the symbol $(g)$, varies somewhat with the latitude and with the material of the earth's crust, particularly that near the surface in the locality where the value of $(g)$ is determined. The latter variation, depending upon the character of the earth's crust, and particularly that portion relatively close to the surface, serves as a means of determining certain characteristics of the crust which are important from various standpoints. Thus, an accurate gravity survey of a portion of the earth's surface may be utilized in the determination of the presence or absence of valuable subterranean deposits. However, due to the fact that the commonly known methods of determining the value of the gravitational constant require considerable time and effort and cannot be economically carried out, this means of determining the location of desirable subterranean deposits has not heretofore become commercially feasible. In the past, it has been considered necessary to separately determine the actual value of $(g)$, at the large number of points required in a survey of this character, by the use of an ordinary gravity pendulum whose period of oscillation had to be accurately determined by the use of an extremely accurate chronometer. It will be apparent that gravity determinations made on this basis can not be sufficiently accurate to locate small variations or discontinuities in the earth's crust. The present invention has, therefore, been largely directed to the development of improved apparatus whereby the value of $(g)$, or preferably its variations from point to point, may be determined with greater ease and accuracy, and with considerable less expense than has heretofore been possible.

An understanding of the present invention may probably be more readily gained through a brief outline of the methods now commonly employed for the determination of the value of $(g)$. If a pendulum is made to swing through an arc that is very small as compared with the length of the pendulum, the time of a single swing bears the relation $$\left(t^2 = \frac{K}{g}\right)$$

to the gravitational constant where $(t)$ is the period of the pendulum and $(K)$ is a constant depending solely upon the physical characteristics of the particular pendulum employed. Should such a pendulum be operated at a place where the value of the gravity constant which may be designated $(g_s)$ is known, then the value of $(K)$ may be determined from the formula $$(K = g_s \times t_s^2).$$

With this known value of $(K)$, the value of $(g)$ at any other location may, of course, be readily determined by an accurate determination of the value of $(t)$. Now since the value of $(g)$ at any particular location, as at a point $(x)$, must be determined from the formula $$\left(g_x = \frac{K}{t_x^2}\right),$$

it will be apparent that any error which may enter into the determination of $(t_x)$ due to inaccuracies in the chronometer employed, will be squared in the determination of the value of $(g_x)$.

As has already been suggested, the bearing of the gravitational constant in the determination of the location of subterranean irregularities is not with relation to the actual value of $(g)$ but is rather with relation to the variation of $(g)$ as determined at various points over an area being surveyed. Consequently it becomes more important to determine the difference in the values of the period ($t$) rather than the absolute values of this time element. It is largely through recognition of this fact that the improvements of the present invention have been developed.

It has been conceived that if two pendulums could be employed, one of which is dependent upon or affected by the value of gravity for its period of swing, and the other of which is independent of the value of gravity at the particular points under consideration, then the variation in the force of gravity from one station to another may readily be determined in terms of the difference in the periods of oscillation of the gravity sensitive pendulum at the two locations as determined from the number of swings which it makes at these stations with relation to the number of swings of the constant or standard pendulum. In other words, the necessity for a direct measurement of time may be dispensed with and the determination of the period or periods of oscillation of the gravity pendulum may be based upon comparison with the number of swings of the pendulum which is not affected by gravity. Very high accuracy in the determination of the time feature is thus made possible and the steps necessary to the ultimate determination are very much simplified due to the elimination of a need for calibrating and reading a chronometer.

One scheme which may be adopted for carrying out the invention contemplates the use of an ordinary gravity pendulum at a definite location where the gravitational constant may be regarded as a standard (and preferably where its value is known). Other gravity pendulums may be shifted about to a variety of points throughout an area which it is desired to survey, or a single exploring pendulum of this kind may be shifted about from place to place. Suitable radio signalling devices may then be employed for sending a signal from the standard pendulum location each time that this pendulum swings past a definite point in its arc of movement. Radio receiving devices located at each of the points where the exploring pendulums are set up may receive these signals so that by a comparison of the period of oscillation of the standard pendulum as indicated by these signals, with the period of oscillation of each of the exploring pendulums thus made possible, the relative periods of all of the pendulums may be determined with great accuracy. A comparison of the periods of oscillation of each exploring pendulum with that of the standard, may be facilitated by the well known method of eclipses, that is, by the determination of the number of times that the two pendulums coincide in their movements through a definite point in the arc of each. It will be understood that the exploring pendulums will usually first be set up at a station adopted as a standard of comparison so that the inherent characteristics of each pendulum may first be determined. From the difference in the times of swing of the several exploring pendulums as they are moved from place to place over the area to be surveyed, the desired variation of the value of ($g$) may readily be determined.

With this general outline, a more definite understanding may be obtained from a consideration of the accompanying drawing which illustrates in a diagrammatic way a suitable form of the apparatus. Of the drawing, the single figure is a view of suitable apparatus which may be employed when the signals from a standard station are utilized for comparison with the exploring pendulum.

Referring now to the apparatus disclosed, (11) represents the bob of a gravity pendulum suspended from a knife-edge bearing (12) by means of a connection (13). An opening (14) is provided preferably through the center of the bob. This portion of the apparatus is to be set up at the particular location where it is desired to determine the value of ($g$). At a distant point which may be adopted as the standard location for purpose of comparison, there may be provided a similar pendulum comprising a bob (15) suspended by a connection (16) from a knife-edge bearing (17) attached to a suitable horizontal support (18). An opening (19) is provided in the bob (15) so that light from a source (20) may pass through the bob to a light sensitive cell (21) located on the opposite side of the bob. It will be apparent that light to affect the cell (21) will pass through the bob once during each swing of the pendulum, or twice during each complete to and fro movement. As the flashes of light strike the light sensitive cell, they will produce fluctuations in the current flowing in an electrical circuit, including such cell as well as a battery (22) and the primary coil of a transformer (23). The electromotive force generated in this way in the secondary coil of the transformer, is made to modulate or interrupt the output from a radio transmitter (24). Energy radiated from this transmitter through the antenna illustrated, will fluctuate perodically in accordance with the period of the standard pendulum (15). Now at the point where the value of ($g$) is to be determined, there is included with the apparatus already mentioned a radio receiver (25), which is adapted to receive the fluctuations in energy transmitted by the device (24) and which is adapted to produce corresponding periodic effects upon the coil of a relay (26). These fluctuations in the coil (26) are adapted to produce corresponding vibrations of an armature (27) which carries a plate (28) at its upper end, the plate being provided with a narrow slit or opening (29). A pair of fixed vanes (30) and (31) are provided between the plate (28) and the bob (11) and these vanes (30) and (31) are provided with narrow slits or openings (32) and (33) respectively. The opening (32) in the vane (30) is similar to the opening (29), but is offset from the latter when the armature is in its normal position, so that light from a source (34) cannot normally pass through the vane (30) and can only do so when the armature is attracted due to the increased energy passing through the coil (26) as the result of a signal emitted from the radio transmitter (24). The slit (33) in the vane (31), which is located adjacent the bob (11) of the gravity pendulum, is so placed that the light flashes which pass through the openings (29) and (32) when the armature is attracted, will pass through the opening (33) and through the opening (14) in the bob when the latter is in its mid-position. Light which thus succeeds in passing through the several openings, may either strike the eye of an observer at the point (35), or if desired, may be made to affect a light sensitive cell. It will be apparent, therefore, that when the two bobs (11) and (15) are set in motion, light from the source (34) will reach the observer's eye at (35) only when the pendulums coincide in passing through their lower normal positions. At such times of eclipse the coil

(26) will be energized due to the effect of the light sensitive cell (21) on the radio transmitter, so that the opening (29) will be alined with the opening (32), and, as assumed, the opening (14) will be alined with the opening (33) so that all four openings are in direct alignment.

The number of swings ($N_0$) of the standard pendulum being known for a period of time, which may be designated as (T) seconds, the period of oscillation of the pendulum (11) may readily be determined from the number of eclipses. Thus, if ($n_x$) represents the number of eclipses between the two pendulums during the period (T), the total number of swings of pendulum (11) will be ($N_0 \pm n_x$), and the period of oscillation may be determined by the equation $$\left(t_x = \frac{T}{N_0 \pm n_x}\right).$$

Development of formulæ

With this general outline of the apparatus which is suitable for the conduct of the method forming the basis of the present invention, the definite way of employing the data obtained to determine the actual or relative values of ($g$) at various points may be briefly explained by the development of a few formulæ. If we let ($t_0$), ($t_1$), ($t_2$), ($t_3$), etc. represent the periods of oscillation of a gravity pendulum at the standard location and at a series of stations (1), (2), (3), etc. respectively, and if we let ($N_0$), ($N_1$), ($N_2$), ($N_3$), represent the number of oscillations of the pendulum at the several points mentioned during a definite total time period of (T) seconds, then we may say that:

(1) $\quad t_0 = \frac{T}{N_0}; \quad t_1 = \frac{T}{N_1}; \quad t_2 = \frac{T}{N_2}; \quad t_3 = \frac{T}{N_3};$ etc.

Now as already stated, if ($g_1$), ($g_2$), ($g_3$), etc. represents the values of the gravitational constant at the several stations (1), (2), (3), etc., we have the further relations:

(2) $\quad t_1 = \frac{K}{\sqrt{g_1}}; \quad t_2 = \frac{K}{\sqrt{g_2}}; \quad t_3 = \frac{K}{\sqrt{g_3}};$ etc.

From these two sets of equations, we readily obtain the following by equating the two different expressions for ($t_1$), ($t_2$), ($t_3$), etc., dividing one equation by another and squaring:

(3) $\quad \frac{g_2}{g_1} = \frac{N_2^2}{N_1^2}; \quad \frac{g_3}{g_1} = \frac{N_3^2}{N_1^2}; \quad \frac{g_4}{g_1} = \frac{N_4^2}{N_1^2};$ etc.

and from these equations we may derive the following:

(4) $\quad \frac{g_2 - g_1}{g_1} = \frac{N_2^2 - N_1^2}{N_1^2}; \quad \frac{g_3 - g_1}{g_1} = \frac{N_3^2 - N_1^2}{N_1^2}; \quad \frac{g_4 - g_1}{g_1} = \frac{N_4^2 - N_1^2}{N_1^2};$ etc.

These last equations form a ready basis for the comparison of the values of ($g$) at a series of stations with respect to its value at the station (1), and since station (1) is thus to be used as a basis of comparison, the factors ($g_1$) and ($N_1$) will have the same value in all of the equations and may be treated as a constant which may be designated by the letter (C), thus changing the equations into the form—

(5) $\quad g_2 - g_1 = C(N_2^2 - N_1^2); \quad g_3 - g_1 = C(N_3^2 - N_1^2); \quad g_4 - g_1 = C(N_4^2 - N_1^2)$ As has been stated hereinbefore, the essential factor which is important in the survey of the earth's crust, is the relative value of ($g$) at various points over the area surveyed rather than the actual value of ($g$). Therefore, values which are proportional to the gravity differences ($g_2 - g_1$), ($g_3 - g_1$), etc., serve the purposes mentioned equally as well as the actual values of these differences. The constant (C), therefore, may for all practical purposes be ignored, or assumed to be of the value of unity. On the other hand, if it should be desired for any reason to determine the actual values of ($g$) at various points, it may readily be done by adopting for purpose of comparison a station where ($g_1$) and ($N_1$) are known.

It will be recognized that the methods hereinbefore described serve to provide the necessary means for determining the values of ($N_1$), ($N_2$), and ($N_3$), etc., by the determination of the number of eclipses between an exploring gravity pendulum and a standard pendulum, either of the torsion type or one of the gravity type, located at a standard point where the actual value of ($N_0$) during a period (T) is known. For example, ($N_2 = N_0 \pm n_2$) and ($N_1 = N_0 \pm n_1$) from which we may determine that—

(6) $\quad (N_2^2 - N_1^2) = 2N_0(n_2 - n_1) + (n_2^2 - n_1^2).$

The value of ($N_0$) is preferably maintained constant in the use of the apparatus at various stations so that the number of eclipses at the different points will be based upon the same number of swings of the standard and upon the same total (T) period. This procedure, it should be noted, completely avoids the necessity for actually counting the number of swings of the standard because its period ($t_0$) is accurately known and an ordinary watch will determine with sufficient accuracy the duration of the total period (T) required for the standard pendulum to execute ($N_0$) oscillations.

By substituting the values of ($N_2^2 - N_1^2$), as given in equation (—(6)—), in the expression for the difference between the value of ($g$) at the points (2) and (1) respectively, as given in equation (—(5)—), we have the following working formula:

(7) $\quad g_2 - g_1 = 2N_0(n_2 - n_1) + (n_2^2 - n_1^2) = (n_2 - n_1)(2N_0 + n_2 + n_1)$ neglecting the value of the constant (C). If absolute values of ($g$) are desired, the value of (C) may, of course, be readily determined from the fact that—

$$\left(C = \frac{g_1}{N_1^2} = \frac{g_1}{(N_0 \pm n_1)^2}\right).$$

The whole formula then assumes the form—

(8) $\quad g_2 - g_1 = \frac{g_1}{N_1^2}(N_2^2 - N_1^2) = \frac{g_1}{(N_0 \pm n_1)^2}[(N_0 \pm n_2)^2 - (N_0 \pm n_1)^2]$ or to make the formula more general for the comparison of the value of ($g$) at any point, as at ($x$), with the value of ($g$) at a standard point ($s$), the formula will be as follows:

(9) $\quad g_x - g_s = \frac{g_s}{(N_0 \pm n_s)^2}(N_0 \pm n_x)^2 - (N_0 \pm n_s)^2$ wherein ($n_s$) and ($n_x$) represent the number of eclipses of the gravity pendulum and the standard pendulum at the respective stations ($s$) and ($x$) while the standard pendulum executes ($N_0$) oscillations.

While an embodiment of the present invention has been explained in the foregoing sections, it will be understood that it is capable of a variety of modifications falling within the scope of the claim which follows. Thus the important feature contemplated by the present invention is the determination of the relative periods of oscillation of two bodies, one of which is affected by the force of gravity at the points surveyed, and the other not. It is not essential that any definite number of swings of the standard pendulum be adopted for the purposes of comparison but if desired, the number of swings of the standard between a definite number of eclipses may be determined or the number of swings of the two oscillating bodies may be determined over any selected period of time. Furthermore, the body herein termed the standard pendulum need not be restricted to a pendulum at all, either torsion or otherwise, but may be any oscillatory body, such as a tuning fork, whose vibrations remain the same regardless of the variations in the force of gravity, while the "gravity-pendulum" may be any body whose oscillations vary with the force of gravity. The comparison of the oscillations of the two bodies may be facilitated by the use of any known type of photographic recording apparatus which will produce a continuous record of the oscillations, preferably in adjacent sections of the same strip.

What I claim is:

In apparatus for determining the gravitational constant at a desired point, a gravity sensitive pendulum located at said point, radio receiving devices adjacent said pendulum and adapted to receive pendulum controlled signals transmitted from a point at which the gravitational constant is known, means provided with an opening and controlled by said radio receiving devices, said pendulum being provided with an opening adapted to be aligned with said first mentioned opening, and means for determining when said openings are in alignment.

HARVEY C. HAYES.